(12) United States Patent
Ishino et al.

(10) Patent No.: US 8,587,896 B1
(45) Date of Patent: Nov. 19, 2013

(54) MOTOR AND DISK DRIVE APPARATUS

(71) Applicant: Nidec Corporation, Kyoto (JP)

(72) Inventors: Takayuki Ishino, Kyoto (JP); Akihiro Yudate, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/794,864

(22) Filed: Mar. 12, 2013

Related U.S. Application Data

(60) Provisional application No. 61/748,532, filed on Jan. 3, 2013.

(51) Int. Cl.
*G11B 17/02* (2006.01)

(52) U.S. Cl.
USPC .......................................... 360/99.08; 310/71

(58) Field of Classification Search
USPC ................. 360/99.08; 310/71, 67 R
See application file for complete search history.

(56) References Cited

U.S. PATENT DOCUMENTS

| | | | | |
|---|---|---|---|---|
| 5,548,458 | A * | 8/1996 | Pelstring et al. | 360/99.08 |
| 6,097,121 | A * | 8/2000 | Oku | 310/91 |
| 6,344,946 | B1 * | 2/2002 | Papst | 360/99.08 |
| 7,012,191 | B1 | 3/2006 | Watanabe et al. | |
| 7,122,922 | B2 * | 10/2006 | Xu et al. | 310/51 |
| 7,122,929 | B2 * | 10/2006 | Kuwert et al. | 310/90 |
| 8,056,210 | B2 * | 11/2011 | Gomyo et al. | 29/596 |
| 8,120,872 | B2 | 2/2012 | Sekii et al. | |
| 8,238,055 | B2 * | 8/2012 | Kim et al. | 360/99.08 |
| 8,363,352 | B2 | 1/2013 | Kang | |
| 8,363,353 | B2 * | 1/2013 | Yawata | 360/99.08 |
| 2005/0206255 | A1 * | 9/2005 | Yoshino et al. | 310/71 |
| 2006/0138886 | A1 | 6/2006 | Ito et al. | |
| 2006/0265871 | A1 | 11/2006 | Ito et al. | |
| 2007/0247010 | A1 | 10/2007 | Ichizaki | |
| 2007/0278880 | A1 | 12/2007 | Wada et al. | |
| 2008/0019038 | A1 | 1/2008 | Xu et al. | |

(Continued)

FOREIGN PATENT DOCUMENTS

| | | |
|---|---|---|
| JP | 05-207717 A | 8/1993 |
| JP | 05-070184 U | 9/1993 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Angel Castro
(74) *Attorney, Agent, or Firm* — Keating & Bennett, LLP

(57) ABSTRACT

A base member of a motor includes a base body portion and a motor base portion. The motor base portion is made of a first kind of metal. The base body portion is made of a second kind of metal. The first kind of metal is larger in Young's modulus than the second kind of metal. The motor base portion includes a base through-hole and a base groove portion. A lead wire of a coil extends radially outward through the base through-hole and the base groove portion. Within the base groove portion, an insulating layer is arranged between the lead wire and a bottom surface of the base groove portion to cover a border between the motor base portion and the base body portion, an outer edge of the base groove portion, and an inner edge of the base body portion opposed to the outer edge.

12 Claims, 10 Drawing Sheets

(56) References Cited

U.S. PATENT DOCUMENTS

| | | |
|---|---|---|
| 2008/0084142 A1 | 4/2008 | Ino et al. |
| 2010/0177627 A1 | 7/2010 | Ino et al. |
| 2012/0200957 A1 | 8/2012 | Yawata |

FOREIGN PATENT DOCUMENTS

| | | |
|---|---|---|
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.
Saeki et al.,"Base Unit", U.S. Appl. No. 13/770,374, filed Feb. 19, 2013.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Masumi et al., "Base Plate, Base Unit, Motor, Disk Drive Apparatus and Method of Manufacturing the Base Plate", U.S. Appl. No. 13/789,974, filed Mar. 8, 2013.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al.,"Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Tamaoka et al., "Motor and Disk Drive Apparatus", U.S. Appl. No. 13/564,900, filed Aug. 2, 2012.

\* cited by examiner

US 8,587,896 B1

MOTOR AND DISK DRIVE APPARATUS

BACKGROUND OF THE INVENTION

1. Field of the Invention

The present invention relates to a motor and a disk drive apparatus.

2. Description of the Related Art

A hard disk device or an optical disk device is equipped with a motor for rotating a disk. The motor includes a stationary unit fixed to a housing of a device and a rotary unit rotating together with a disk supported thereon. In the motor, torque acting about a center axis is generated by magnetic flux generated between the stationary unit and the rotary unit, whereby the rotary unit is rotated with respect to the stationary unit.

A conventional motor is provided with, e.g., a base member, coils, and a wiring substrate. Lead wires extending from the coils are led out via through-holes of the base member and are connected to the wiring substrate.

In this motor, it is necessary to electrically insulate the lead wires led out from the coils and the base member. Particularly, in recent years, the motor grows smaller and smaller in height. Consequently, the diameter of the lead wires which define the coils tends to become smaller. If the diameter of the lead wires becomes smaller, protection films covering the lead wires becomes thinner. For that reason, if the lead wires having a small diameter make contact with the base member, the lead wires may possibly be damaged even by a light contact. Accordingly, it is desirable to make sure that the lead wires do not make contact with the base member even under a tension state.

SUMMARY OF THE INVENTION

A motor according to an illustrative preferred embodiment of the present invention is used in a disk drive apparatus for rotating a disk about a center axis extending in an up-and-down direction. The motor includes a base member and a stator. The base member extends radially outward from the center axis. The stator is supported on the base member and is provided with a plurality of coils. The base member includes a base body portion and a motor base portion. The base body portion includes a through-hole or a depressed portion and has a radially-extending flat shape. The motor base portion includes a disc-shaped bottom portion extending radially outward. The motor base portion is arranged in the through-hole or the depressed portion of the base body portion. The motor base portion is made of a first kind of metal. The base body portion is made of a second kind of metal. The first kind of metal is larger in Young's modulus than the second kind of metal. The motor base portion includes a base through-hole and a base groove portion. The base through-hole is arranged to bring an upper surface and a lower surface of the motor base portion into communication with each other. The base groove portion is positioned on the lower surface of the motor base portion and is depressed toward the upper surface of the motor base portion. The base groove portion extends radially outward from the base through-hole and reaches a radial outer edge of the lower surface of the motor base portion. At least one lead wire is led out from the coils. The lead wire extends from the upper surface of the motor base portion to the lower surface of the motor base portion via the base through-hole and then extends radially outward through the base groove portion. At least a portion of a lower surface of the base body portion is covered with an insulating film. The motor base portion includes an outer circumferential surface. The base body portion includes an inner circumferential surface opposed to the outer circumferential surface of the motor base portion. Each of the outer circumferential surface of the motor base portion and the inner circumferential surface of the base body portion includes an exposed region which is not covered with the insulating film. An insulating layer is arranged between the lead wire and a bottom surface of the base groove portion to cover a border between the motor base portion and the base body portion, an outer edge of the base groove portion, and an inner edge of the base body portion opposed to the outer edge of the base groove portion.

According to an illustrative preferred embodiment of the present invention, the lead wire contacts, through the insulating layer, the border between the motor base portion and the base body portion, the outer edge of the base groove portion, and the inner edge of the base body portion opposed to the outer edge of the base groove portion. Therefore, even if the coating of the lead wire is damaged, the lead wire is prevented from directly contacting the exposed region of each of the outer circumferential surface of the motor base portion and the inner circumferential surface of the base body portion opposed to the outer circumferential surface of the motor base portion. Accordingly, even when the coating of the lead wire is damaged, it is possible to reliably insulate the exposed region and the lead wire from each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Certain illustrative preferred embodiments of the present invention will now be described with reference to the drawings. In the following description, the direction parallel to a center axis of a motor will be referred to as "axial". The direction orthogonal to the center axis of the motor will be referred to as "radial". The direction running along an arc about the center axis of the motor will be referred to as "circumferential". The shape and positional relationship of individual components will be described under the assumption that the axial direction is an up-and-down direction and further that the side of a stator with respect to a base member is an upper side. However, such definition of the up-and-down direction is not intended to limit the in-use orientation of the motor and the disk drive apparatus according to the present invention.

In the following description, the term "parallel" includes both the term "parallel" and the term "substantially parallel". The term "orthogonal" includes both the term "orthogonal" and the term "substantially orthogonal".

Figure 1:
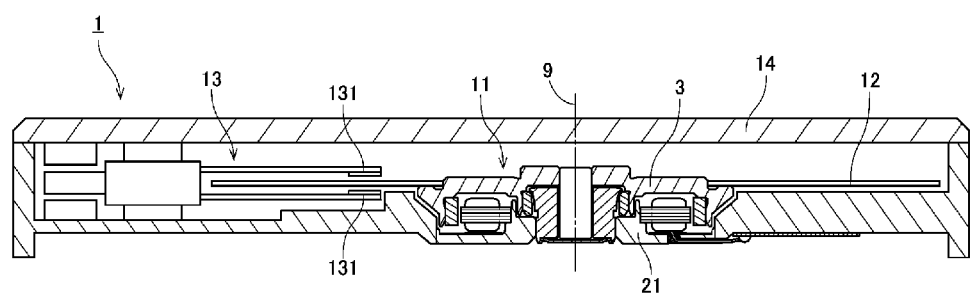
FIG. 1 is a vertical sectional view showing a disk drive apparatus according to a preferred embodiment of the present invention.

FIG. 1 is a vertical sectional view showing a disk drive apparatus 1 according to a first preferred embodiment of the present invention. The disk drive apparatus 1 is an apparatus arranged to rotate at least one disk 12 through the use of a motor 11 and performing at least one of information "reading" and "writing" tasks with respect to the disk 12. As shown in FIG. 1, the disk drive apparatus 1 preferably includes a motor 11, a disk 12, a head 131, an access unit 13, and a cover 14. The disk 12 is preferably, e.g., a magnetic disk or the like.

The motor 11 supports the disk 12 and rotates the disk about a center axis 9. The motor 11 preferably includes a base member 21 extending radially outward from the center axis 9. The upper region of the base member 21 is covered with the cover 14. The rotary unit 3 of the motor 11, the disk 12, the head 131, and the access unit 13 are accommodated within a housing defined by the base member 21 and the cover 14. The access unit 13 displaces the head 131 along a recording surface of the disk 12. The head 131 performs at least one of information "reading" and "writing" tasks with respect to the disk 12.

The disk drive apparatus 1 may have two or more disks 12.

Figure 2:
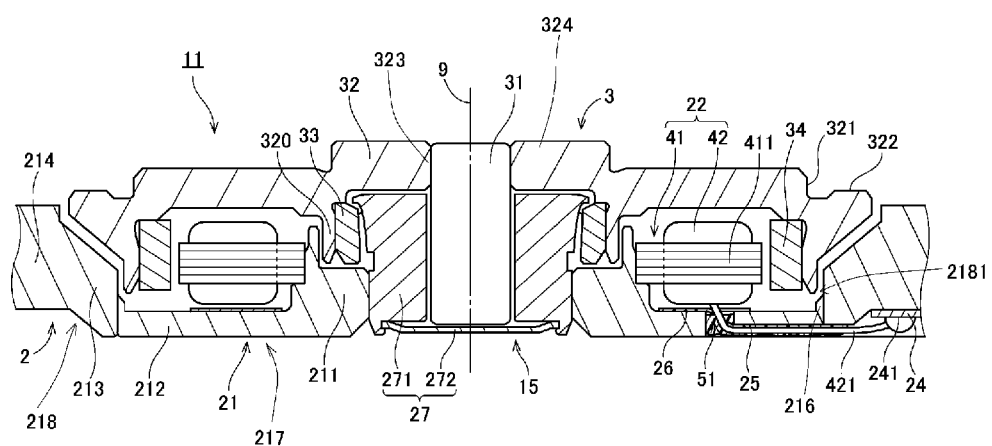
FIG. 2 is a vertical sectional view of a motor according to a preferred embodiment of the present invention.

FIG. 2 is a vertical sectional view of the motor 11. As shown in FIG. 2, the motor 11 preferably includes a stationary unit 2 and a rotary unit 3. The stationary unit 2 is kept stationary with respect to the rotary unit 3. The rotary unit 3 is rotatably supported with respect to the stationary unit 2.

The stationary unit 2 preferably includes a base member 21, a stator 22, a wiring substrate 24, a first insulating sheet 25, a second insulating sheet 26, and a bearing unit 27.

The base member 21 is arranged below the rotary unit 3 to extend radially outward from the center axis 9. The base member 21 preferably includes a motor base portion 217 and a base body portion 218.

The motor base portion 217 is a preferably a flat or substantially flat member and is arranged within a through-hole 2181. The motor base portion 217 preferably includes a first cylinder portion 211, a bottom portion 212, a second cylinder portion 216, and a base through-hole 51.

The base through-hole 51 serves to bring the upper surface and the lower surface of the motor base portion 217 into communication with each other. More specifically, the base through-hole 51 is arranged in the bottom portion 212 to axially extend through the bottom portion 212. The bottom portion 212 is an annular member and extends radially outward from the center axis 9. The bottom portion 212 is arranged axially below the stator 22. There is provided at least one base through-hole 51. There may be a plural number of base through-holes 51, if so desired. The base through-hole 51 may be parallel to the axial direction or may be inclined with respect to the axial direction. Alternatively, the base through-hole 51 may be parallel or substantially parallel to the radial direction.

The first cylinder portion 211 is arranged at the center or substantially at the center of the bottom portion 212. The first cylinder portion 211 preferably has a cylindrical or substantially cylindrical shape. The first cylinder portion 211 extends axially upward from the bottom portion 212. More specifically, the first cylinder portion 211 extends axially upward from the radial inner edge portion of the bottom portion 212.

The second cylinder portion 216 is a cylindrical or substantially cylindrical member. The second cylinder portion 216 extends axially upward from the radial outer edge portion of the bottom portion 212. The inner circumferential surface of the second cylinder portion 216 is radially opposed to the outer circumferential surface of the first cylinder portion 211. In other words, the inner circumferential surface of the second cylinder portion 216 surrounds the outer circumferential surface of the first cylinder portion 211. The axial upper end portion of the second cylinder portion 216 is arranged axially below the axial upper end portion of the first cylinder portion 211.

As the material of the motor base portion 217, it is possible to use, e.g., ferromagnetic stainless steel, non-magnetic stainless steel, an electromagnetic steel plate, a cold-rolled steel plate, etc. More specifically, austenite-based stainless steel such as SUS303 or SUS304, martensite-based stainless steel such as SUS420, or ferrite-based stainless steel such as SUS430 can be used as the material of the motor base portion 217. However, other kinds of stainless steel may be used as the material of the motor base portion 217. Instead of an alloy, pure or substantially pure iron may alternatively be used as the material of the motor base portion 217 if so desired. The material of the motor base portion 217 may be magnetic metal or non-magnetic metal. The motor base portion 217 can preferably be formed by cutting or other desirable methods, e.g., press working or forging.

At least a portion of the motor base portion 217 is positioned axially below the magnet 34, to be described later. Therefore, if the material of the motor base portion 217 is ferromagnetic, a magnetic attraction force is generated between the motor base portion 217 and the magnet 34. Thus, the rotary unit 3 is attracted toward the stationary unit 2 because of the magnetic attraction force between the motor base portion 217 and the magnet 34. As a result, even when a shocking force is applied from the outside to the motor 11, it is possible to prevent the rotary unit 3 from being axially separated from the stationary unit 2.

The base body portion 218 is a flat or substantially flat member extending radially outward. The base body portion 218 preferably includes a through-hole 2181, an annular wall portion 213 and a base body bottom portion 214.

Figure 3:
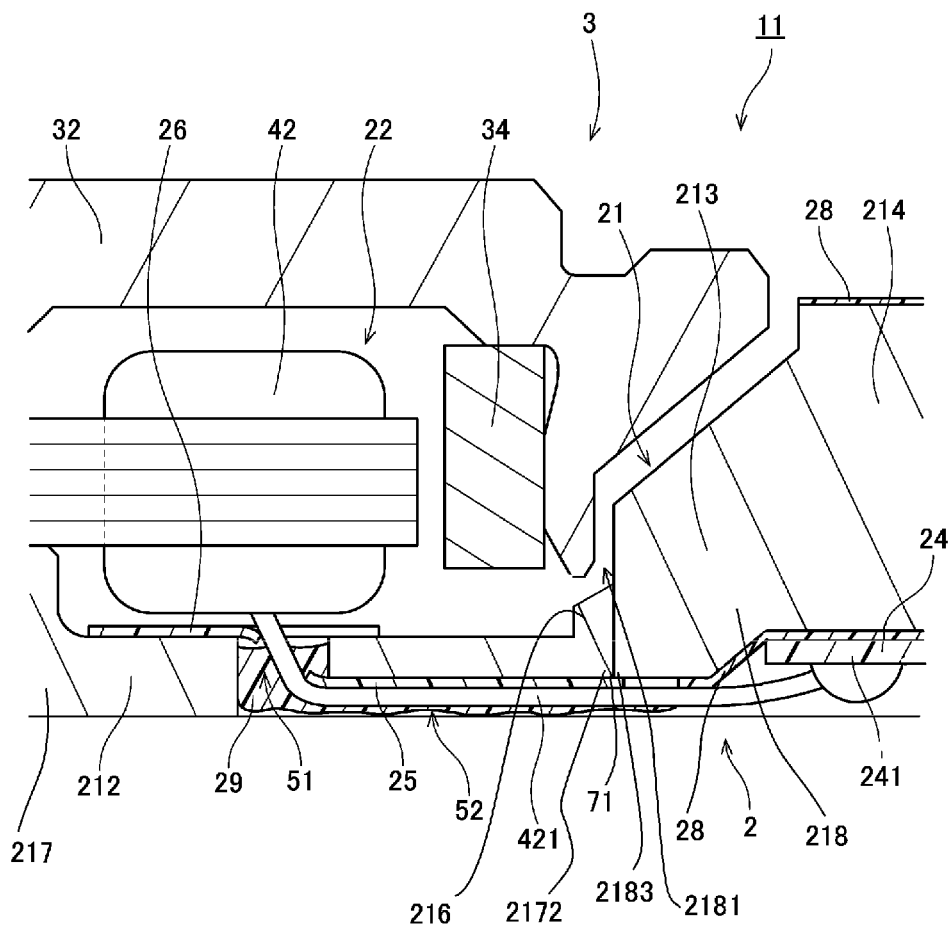
FIG. 3 is a partial vertical sectional view of the motor according to a preferred embodiment of the present invention.

As shown in FIGS. 2 and 3, the through-hole 2181 is a through-hole axially extending through the base member 21. The inner circumferential surface of the base body portion 218 defines the through-hole 2181. The motor base portion 217 is arranged within the through-hole 2181. The outer circumferential surface of the motor base portion 217 is radially opposed to the inner circumferential surface of the base body portion 218. In the following description, the inner circumferential surface of the base body portion 218 opposed to the outer circumferential surface of the motor base portion 217 will be referred to as "the inner circumferential surface of the base body portion 218". In other words, the through-hole 2181 is radially opposed to the end portion of the motor base portion 217. More specifically, the inner circumferential surface of the base body portion 218 defining the through-hole 2181 is radially opposed to the outer circumferential surface of the second cylinder portion 216. The motor base portion 217 is fixed to the inner circumferential surface of the base body portion 218 preferably by, e.g., press-fitting, bonding, etc. In case where the motor base portion 217 is fixed to the base body portion 218 by bonding, an adhesive agent is preferably arranged between the end portion of the motor base portion 217 (i.e., the outer circumferential surface of the second cylinder portion 216) and the peripheral edge portion of the base body portion 218 (i.e., the inner circumferential surface of the base body portion 218) (see FIG. 4). Preferably, a non-conductive adhesive agent is used as the adhesive agent. If the adhesive agent is a non-conductive adhesive agent, the non-conductive adhesive agent, when protruded toward the lower surface of the base member 21, covers the border 71 between the motor base portion 217 and the base body portion 218 (see FIG. 3), the outer edge 2172 of a base groove portion 52 (see FIG. 3) and the inner edge 2183 of the base body portion 218 (hereinafter referred to as "inner edge 2183") opposed to the outer edge 2172 (see FIG. 3). That is to say, the adhesive agent defines an insulating layer. In other words, the insulating layer preferably covers the border 71 between the motor base portion 217 and the base body portion 218 (see FIG. 3), the outer edge 2172 of the base groove portion 52 (see FIG. 3), and the inner edge 2183 of the base body portion 218 (see FIG. 3).

As shown in FIG. 2, the inner circumferential surface of the base body portion 218 preferably includes an annular wall portion 213 inclined with respect to the center axis 9. In other words, the radial distance between the center axis 9 and the annular wall portion 213 is gradually increased axially upward. The annular wall portion 213 is arranged radially outward of the inner circumferential surface of the base body portion 218. The annular wall portion 213 is radially and axially opposed to a hub 32.

The base body bottom portion 214 extends further radially outward from the radial outer edge portion of the annular wall portion 213. The base body bottom portion 214 is arranged axially above the bottom portion 212. The base body bottom portion 214 is arranged axially above the axial upper end portion of the first cylinder portion 211. The base body bottom portion 214 is arranged axially above the axial upper end portion of the second cylinder portion 216.

For example, aluminum is preferably used as the material of the base body portion 218. In other words, the first kind of material used as the motor base portion 217 is larger in the Young's modulus than the second kind of material used as the base body portion 218. The base body portion 218 can preferably be produced by, e.g., casting metal such as aluminum, and aluminum alloy, or the like. However, the base body portion 218 may be produced by other methods such as, for example, cutting, press working, etc. The motor base portion 217 can preferably be produced by, e.g., cutting, pressing or forging stainless steel. Each of the base body portion 218 and the motor base portion 217 may alternatively be defined by a plurality of elements or component parts if so desired.

As shown in FIG. 3, some portions of the stator 22, the second insulating sheet 26, and the rotary unit 3 are accommodated at the upper side of the bottom portion 212 and at the radial inner side of the annular wall portion 213. For that reason, the axial position of the base body bottom portion 214 is flush or substantially flush with the axial positions of some portions of the stator 22 and the rotary unit 3. The wiring substrate 24 is arranged radially outward of the bottom portion 212 and the annular wall portion 213. Thus, the stator 22 and the wiring substrate 24 do not axially overlap with each other. Accordingly, it is possible to arrange the wiring substrate 24 axially above the lower surface of the bottom portion 212 and to reduce the axial dimension of the motor 11 as a whole.

As shown in FIG. 2, the stator 22 preferably includes a stator core 41 and a plurality of coils 42. The stator core 41 and the coils 42 are supported on the base member 21 and are arranged axially above the bottom portion 212. The stator core is preferably made of, e.g., a steel plate laminate. The steel plate laminate is preferably produced by axially stacking a plurality of electromagnetic steel plates (such as, for example, silicon steel plates) one above another. The stator core 41 is preferably fixed to the outer circumferential surface of the first cylinder portion 211 by, for example, press-fitting, bonding, etc. The stator core 41 preferably includes a plurality of teeth 411 extending radially outward. Preferably, the teeth 411 are arranged at a regular or substantially regular interval along the circumferential direction.

Each of the coils 42 is preferably defined by at least one lead wire 421 wound around each of the teeth 411. In the present preferred embodiment, the motor 11 preferably is a three-phase motor, for example. For that reason, the coils 42 correspond to three lead wires 421 arranged to supply electric currents of three different phases therethrough. The end portion of each of the lead wires 421 is led out from each of the coils 42 and is drawn from the upper surface of the motor base portion 217 to the lower surface thereof via the base through-hole 51 defined in the bottom portion 212. Moreover, the end portion of each of the lead wires 421 is led radially outward through the base groove portion 52. In this manner, the lead wires 421 are led out toward the lower surface of the base member 21.

The wiring substrate 24 is arranged on the lower surface of the base member 21. More specifically, the wiring substrate 24 is arranged on the lower surface of the base body bottom portion 214. The wiring substrate 24 is connected to an external power source. The wiring substrate 24 preferably includes at least one land portion 241. The land portion 241 is a region where a copper layer is exposed. The land portion 241 is arranged on the lower surface of the wiring substrate 24. In the present preferred embodiment, three land portions 241 preferably are provided. Each of the lead wires 421 led out from the base through-hole 51 is connected to each of the land portions 241 by, e.g., soldering (using a lead-containing solder or a lead-free solder). In other words, the wiring substrate 24 is electrically connected to the respective lead wires 421. Moreover, the wiring substrate 24 electrically connected to the respective land portions 241. Consequently, the wiring substrate is electrically connected to the coils 42. An electric current used in driving the motor 11 is supplied from an external power source to the coils 42 via the wiring substrate 24.

The land portions 241 are arranged on the lower surface of the base body portion 218. Preferably, the land portions 241 are arranged on the lower surface of the base body bottom portion 214. By arranging the land portions 241 on the lower surface of the base body bottom portion 214, it is possible to prevent solder portions from protruding below the lower surface of the base member 21. As a result, it becomes possible to reduce the overall height of the motor 11. For that reason, the stator 22 and the land portions 241 do not axially overlap with each other. It is therefore possible to arrange the land portions 241 axially above the lower surface of the bottom portion 212. This makes it possible to reduce the axial dimension of the motor 11 as a whole.

The number of the lead wires 421 led out from the base through-hole 51 is not limited to three. For example, four lead wires 421 may be led out from the base through-hole 51. One lead wire 421 may be led out from one base through-hole 51. A plurality of lead wires 421 may be led out from one base through-hole 51. A base through-hole 51 from which the lead wires 421 are led out and a base through-hole 51 from which the lead wires 421 are not led out may be provided if so desired. The number of the land portions 241 may be appropriately changed in conformity with the number of the lead wires 421 connected thereto.

In the present preferred embodiment, for example, a flexible printed circuit substrate having flexibility is preferably used as the wiring substrate 24. Use of the flexible printed circuit substrate makes it possible to arrange the wiring substrate 24 along the irregularities of the lower surface of the base member 21. Use of the flexible printed circuit substrate also makes it possible to reduce the axial thickness of the wiring substrate 24 as compared with other kinds of substrates. Accordingly, it is possible to further reduce the axial dimension of the motor 11.

As shown in FIG. 2, the bearing unit 27 preferably includes a sleeve 271 and a cap 272. The sleeve 271 is a cylindrical or substantially cylindrical member having a through-hole. A cylindrical or substantially cylindrical columnar shaft 31, to be described later, is inserted through the through-hole of the sleeve 271. The lower portion of the sleeve 271 is accommodated at the radial inner side of the cylinder portion of the base member 21. The lower portion of the sleeve 271 is preferably fixed to the cylinder portion of the base member 21 by, e.g., an adhesive agent. The inner circumferential surface of the sleeve 271 defining the through-hole thereof is radially opposed to the outer circumferential surface of the shaft 31. The cap 272 closes a lower opening of the sleeve 271. The sleeve 271 may be formed of a plurality of elements or component parts if so desired.

In the present preferred embodiment, the rotary unit 3 preferably includes a shaft 31, a hub 32, an annular member 33, and a magnet 34.

As stated above, the shaft 31 is a cylindrical or substantially cylindrical columnar member. The shaft 31 axially extends at the radial inner side of the through-hole of the sleeve 271. For example, a metal such as ferromagnetic stainless steel or non-magnetic stainless steel is preferably used as the material of the shaft 31. The upper end portion of the shaft 31 protrudes axially above the upper surface of the sleeve 271.

The hub 32 preferably includes a flat or substantially flat top plate portion 324. A hub through-hole 323 is arranged in the top plate portion 324. The upper end portion of the shaft 31 is inserted through the hub through-hole 323. The upper end portion of the shaft 31 is preferably fixed to the hub through-hole 323 by, e.g., press-fitting, bonding, etc. The top plate portion 324 extends radially outward from the peripheral edge of the upper end portion of the shaft 31. As shown in FIG. 2, an annular projection 320 protruding axially downward is arranged on the lower surface of the top plate portion 324 of the hub 32. The annular member 33 is fixed to the inner circumferential surface of the annular projection 320. The annular member 33 is preferably fixed to the inner circumferential surface of the annular projection 320 by, e.g., press-fitting, bonding, etc. The inner circumferential surface of the annular member 33 is radially opposed to the outer circumferential surface of the sleeve 271.

The hub 32 preferably includes a first holding portion 321 and a second holding portion 322. The first holding portion 321 is preferably a cylindrical or substantially cylindrical portion. The first holding portion 321 extends radially outward from the radial outer end portion of the top plate portion 324. The second holding portion 322 extends radially outward from the lower end portion of the first holding portion 321. The disk 12 has a disk through-hole. The disk through-hole extends through the thickness of the disk 12. When the disk 12 is arranged on the motor 11, the inner peripheral portion of the disk through-hole contacts at least a portion of the outer circumferential surface of the first holding portion 321. The lower surface of the disk 12 contacts at least a portion of the second holding portion 322. Consequently, the disk 12 is held on the hub 32.

A lubricant is preferably provided between the shaft 31 and the bearing unit 27, between the hub 32 and the bearing unit 27, and between the annular member 33 and the bearing unit 27. The liquid level of the lubricant is preferably positioned between the sleeve 271 and the annular member 33. For example, polyol ester-based oil or diester-based oil is preferably used as the lubricant. During the operation of the motor 11, the shaft 31 is rotatably supported with respect to the bearing unit 27 through the lubricant.

That is to say, in the present preferred embodiment, a bearing mechanism 15 preferably includes the sleeve 271 and the cap 272, which are members belonging to the stationary unit 2; the shaft 31, the hub 32, and the annular member 33, which are members belonging to the rotary unit 3; and the lubricant existing between these members. The bearing mechanism 15 is accommodated within the cylinder portion 211. The rotary unit 3 is supported on the bearing mechanism 15 and is rotated about the center axis 9.

The magnet 34 is arranged radially outward of the stator 22 and is preferably fixed to the inner circumferential surface of the hub 32 by bonding or other methods. In the present preferred embodiment, the magnet 34 preferably has an annular or substantially annular shape. The inner circumferential surface of the magnet 34 is radially opposed to the radial outer end surfaces of the teeth 411. The inner circumferential surface of the magnet 34 is alternately magnetized with N-poles and S-poles along the circumferential direction. As mentioned above, the magnet 34 is axially opposed to the motor base portion 217. A magnetic attraction force is generated between the magnet 34 and the motor base portion 217.

A plurality of magnets 34 may be used in place of the annular magnet 34. In case of using a plurality of magnets 34, they may be arranged along the circumferential direction so that N-poles and S-poles can be alternately lined up.

In the motor 11 described above, if an electrical drive current is supplied from an external power source to the coils 42 via the circuit substrate 24, magnetic flux is generated in the coils 42. Then, circumferential torque is generated between the coils 42 and the magnet 34 by the interaction of the magnetic flux between the coils 42 and the magnet 34. As a result, the rotary unit 3 will rotate about the center axis 9 with respect to the stationary unit 2. The disk 12 supported on the hub 32 rotates about the center axis 9 together with the rotary unit 3.

FIG. 3 is a partial vertical sectional view of the motor 11. As described above, the motor base portion 217 includes a base through-hole 51. The base through-hole 51 is arranged below the stator 22 to axially extend through the bottom portion 212. A radially-extending base groove portion 52 is arranged on the lower surfaces of the bottom portion 212 and the annular wall portion 213. The base groove portion 52 is a recess portion positioned on the lower surface of the base member 21 and depressed toward the upper surface of the base member 21. More specifically, the base groove portion 52 is a recess portion positioned on the lower surface of the motor base portion 217 and depressed toward the upper surface of the motor base portion 217. The base groove portion 52 extends radially outward from the lower end portion of the base through-hole 51 and reaches the radial outer edge 2172 of the lower surface of the motor base portion 217. In other words, the base groove portion 52 is arranged to extend from the lower surface of the motor base portion 217 to the base body portion 218. The lower end portion of the base through-hole 51 is opened into the base groove portion 52. The border 71 between the base body portion 218 and the motor base portion 217 is positioned in the base groove portion 52. More specifically, the border 71 between the inner circumferential surface of the base body portion 218 and the outer circumferential surface of the second cylinder portion 216 (see FIG. 2) of the motor base portion 217 defines a portion of the bottom portion defining the base groove portion 52.

The base body portion 218 is preferably subjected to an insulating process and is covered with an electrically insulating film 28. For that reason, at least a portion of the lower surface of the base body portion 218 is covered with the insulating film 28. Therefore, even if the wiring substrate 24 and the lead wires 421 contact the lower surface of the base body portion 218, it is possible to prevent short-circuiting. The insulating film 28 is preferably, e.g., an electrodeposition coating film.

As stated above, the motor base portion 217 is arranged in the through-hole 2181 of the base body portion 218. The motor base portion 217 needs to be accurately arranged within the through-hole 2181. For that reason, the outer circumferential surface of the motor base portion 217 and the inner circumferential surface of the base body portion 218 radially opposed to the outer circumferential surface of the motor base portion 217 (hereinafter referred to as "the inner circumferential surface of the base body portion 218") are required to have a high degree of dimensional accuracy. However, as mentioned above, the base body portion 218 is covered with the insulating film 28. The accuracy of the thickness of the insulating film 28 is lower than the machining accuracy in cutting the inner circumferential surface of the base body portion 218. Accordingly, in order to comply with the machining accuracy of the inner circumferential surface of the base body portion 218, it is necessary to machine the inner circumferential surface of the base body portion 218 defining the through-hole 2181 after the insulating process. At least a portion of the insulating film 28 covering the base body portion 218 is removed by the machining work. That is to say, it is sometimes the case that an exposed region which is not covered with the insulating film 28 is provided in the base body portion 218. More specifically, an exposed region is preferably provided on the inner circumferential surface of the base body portion 218. In other words, the inner circumferential surface of the base body portion 218 preferably includes an exposed region. In addition, the outer circumferential surface of the motor base portion 217 or the border groove portion 72 to be described later has an exposed region.

As shown in FIG. 3, an insulating layer is arranged within the base groove portion 52. The first insulating sheet 25 is used as one example of the insulating layer in accordance with a preferred embodiment of the present invention. In the present preferred embodiment, the first insulating sheet 25 is arranged within the base groove portion 52. The first insulating sheet 25 is preferably fixed to the bottom surface of the base groove portion 52 by, for example, an adhesive agent, a sticky material, etc. More specifically, the first insulating sheet 25 is arranged to extend from the lower surface of the motor base portion 217 to the lower surface of the base body portion 218. The first insulating sheet 25 is positioned between the lead wires 421 and the bottom surface of the base groove portion 52. The first insulating sheet 25 preferably covers the border 71 between the motor base portion 217 and the through-hole 2181 of the base body portion 218, the outer edge 2172 of the base groove portion 52, and the inner edge 2183 of the base body portion 218 opposed to the outer edge 2172.

As stated above, there is a likelihood that a region which is not covered with the insulating film 28 may be provided in the peripheral edge portion of the inner circumferential surface defining the through-hole 2181. Moreover, the motor base portion 217 is preferably not subjected to an insulating process and is preferably not covered with the insulating film 28. For that reason, there is a likelihood that regions not subjected to an insulating process, e.g., regions not covered with the insulating film 28, may be provided in the border 71 between the motor base portion 217 and the base body portion 218 (namely, the border 71 between the outer edge 2172 of the motor base portion 217 on the lower surface of the base member 21 and the inner edge 2183 of the base body portion 218). Therefore, there is a need to prevent the lead wires 421 from contacting the regions not covered with the insulating film 28. More specifically, it is preferable to cover the border 71 (see FIG. 3), the outer edge 2172 of the base groove portion 52 and the inner edge 2183 of the base body portion 218 (see FIG. 3) with an electrically insulating layer.

Accordingly, the first insulating sheet 25 as an insulating layer is preferably arranged to cover the lower surface of the motor base portion 217 defining the base groove portion 52, the border between the motor base portion 217 and the base body portion 218, the outer edge 2172 of the base groove portion 52 and the inner edge 2183 of the base body portion 218. Therefore, the lead wires 421 arranged within the base groove portion 52 are prevented from directly contacting the border 71, the lower surface of the motor base portion 217 in the base groove portion 52, and the exposed region of the base body portion 218.

The radial inner end portion of the first insulating sheet 25 is preferably arranged in the base through-hole 51 to cover at least a portion of the inner circumferential surface defining the base through-hole 51. Therefore, the lead wires 421 led out from the respective coils 42 are prevented from directly contacting the inner circumferential surface defining the base through-hole 51. As a result, the lead wires 421 are electrically insulated from the motor base portion 217.

An insulating process may be performed in such a way to arrange an adhesive agent or an insulating sheet on the inner circumferential surface defining the base through-hole 51 and on the axial upper and lower peripheral edge portions of the base through-hole 51. In this case, the lead wires 421 are prevented from directly contacting the motor base portion 217.

The second insulating sheet 26 is preferably arranged on the upper surface of the bottom portion 212 of the motor base portion 217. Preferably, the second insulating sheet 26 is fixed to the upper surface of the bottom portion 212 by an adhesive agent, a sticky material, etc. It is preferred that the contour of the second insulating sheet 26 corresponds in shape to the bottom portion 212. For example, if the bottom portion 212 has an annular or a substantially annular shape when seen axially, the contour of the second insulating sheet 26 may have an annular or a substantially annular shape when axially seen. Alternatively, a plurality of second insulating sheets 26 may be arranged on the bottom portion 212 along the circumferential direction.

The second insulating sheet 26 is arranged between the bottom portion 212 and the coils 42 such that the base member 21 is prevented from contacting the coils 42. Therefore, the base member 21 is electrically insulated from the coils 42. By arranging the second insulating sheet 26 between the bottom portion 212 and the coils 42, it is possible to have the coils 42 come close to the bottom portion 212. This makes it possible to reduce the height of the motor 11.

An electrically insulating material, e.g., a resin such as polyethylene terephthalate (PET) or the like, is preferably used as the material of the first insulating sheet 25 and the second insulating sheet 26. The thickness of the first insulating sheet 25 and the second insulating sheet 26 is preferably larger than the thickness of the insulating film 28 and is smaller than the thickness of the wiring substrate 24 measured in the land portions 241. At least a portion of the surface of the base body portion 218 may be covered with a metal plating layer. In that case, it is preferred that the thickness of the first insulating sheet 25 be larger than the thickness of the metal plating layer.

As shown in FIG. 3, each of the lead wires 421 extends toward the base through-hole 51 from the upper side of the bottom portion 212 and from the radial inner side of the center of the base through-hole 51. Each of the lead wires 421 is led out into the base groove portion 52 via the base through-hole 51. Within the base groove portion 52, each of the lead wires 421 extends radially outward along the lower surface of the first insulating sheet 25. The end portion of each of the lead wires 421 is soldered to each of the land portions 241 of the wiring substrate 24 at the radial outer side of the bottom portion 212.

Each of the lead wires 421 led out toward the lower surface of the bottom portion 212 in this manner is accommodated within the base groove portion 52. The axial depth of the base groove portion 52 is preferably larger than the sum of the thickness of the first insulating sheet 25 and the diameter of each of the lead wires 421. Thus, each of the lead wires 421 is prevented from protruding below the lower surface of the bottom portion 212. As a result, the axial thickness of the motor 11 is reduced. The diameter of each of the lead wires 421 mentioned above denotes the diameter in a cross section including both a bare conductor of each of the lead wires 421 and a protection film covering the bare conductor.

The first insulating sheet 25 is preferably interposed between the lower surface of the bottom portion 212 and each of the lead wires 421. The second insulating sheet 26 is preferably interposed between the upper surface of the bottom portion 212 and each of the lead wires 421. This arrangement prevents the base member 21 and the lead wires 421 from contacting each other. Thus, the base member 21 and the lead wires 421 are electrically insulated from each other. Particularly, in the present preferred embodiment, when seen in a plan view, a portion of the first insulating sheet 25 overlaps with the radial outer end portion of the lower opening of the base through-hole 51. Moreover, when seen in a plan view, a portion of the second insulating sheet 26 overlaps with the radial inner end portion of the upper opening of the base through-hole 51. This prevents the base member 21 and the lead wires 421 from contacting each other.

The second insulating sheet 26 is preferably interposed between the radial inner upper corner portion of the inner circumferential surface defining the base through-hole 51 and each of the lead wires 421. For that reason, each of the lead wires 421 does not contact the upper corner portion. Thus, stresses are prevented from concentrating on the lead wires 421. As a result, the lead wires 421 are prevented from becoming damaged.

Each of the lead wires 421 led out from the coils 42 preferably includes a bare conductor and a protection film (not shown) covering the bare conductor, which is made of an electrically insulating material. The protection film is easily damaged when contacting a rigid material such as metal or the like. In the present preferred embodiment, the lead wires 421 contact the first insulating sheet 25 and the second insulating sheet 26 which are lower in rigidity than the metal of which the base member 21 is made. Thus, the protection film is prevented from being damaged. Even if the protection film of each of the lead wires 421 becomes damaged, there is no possibility that the lead wires 421 and the base member 21 contact each other. In particular, the first insulating sheet 25 and the second insulating sheet 26 are made of an electrically insulating material. This prevents electric conduction between the lead wires 421 and the base member 21.

In the present preferred embodiment, the radial inner end portion of the first insulating sheet 25 is positioned radially inward of the radial outer lower corner portion of the inner circumferential surface defining the base through-hole 51. In other words, at least a portion of the radial inner end portion of the first insulating sheet 25 axially overlaps with the base through-hole 51. The radial inner end portion of the first insulating sheet 25 is positioned near the lower corner portion. The radial inner end portion of the first insulating sheet 25 extends away from the inner circumferential surface defining the base through-hole 51. In other words, the radial inner end portion of the first insulating sheet 25 becomes a free end. The lead wires 421 contact the radial inner end portion of the first insulating sheet 25. Thus, the first insulating sheet 25 is bent upward at the radial inner side of the lower corner portion. This reduces the force generated between the first insulating sheet 25 and the lead wires 421. As a result, the lead wires 421 are further prevented from being damaged.

Similarly, the radial outer end portion of the second insulating sheet 26 existing within the base through-hole 51 is preferably positioned radially outward of the radial inner upper corner portion of the inner circumferential surface. The radial outer end portion of the second insulating sheet 26 is preferably positioned near the upper corner portion. The radial outer end portion of the second insulating sheet 26 is bent downward by the lead wires 421 making contact therewith. This reduces the force generated between the second insulating sheet 26 and the lead wires 421. As a result, the lead wires 421 are further prevented from being damaged.

In the present preferred embodiment, the lead wires 421 extend from the coils 42 to the land portions 241 with little slackness. In other words, tension is preferably exerted on each of the lead wires 421. This prevents the lead wires 421 from protruding downward from the base groove portion 52. However, if tensions are exerted on the lead wires 421, the protection films covering the surfaces of the lead wires 421 get damaged with ease. In the present preferred embodiment, however, the external forces applied to the lead wires 421 are reduced by the first insulating sheet 25 and the second insulating sheet 26. As a result, the lead wires 421 are prevented from being damaged.

In the present preferred embodiment, the first insulating sheet 25 and the wiring substrate 24 are preferably defined by different members. The radial outer end portion of the first insulating sheet 25 is positioned radially inward of the radial inner end portion of the wiring substrate 24. The lower surface of the annular wall portion 213 is positioned between the radial outer end portion of the first insulating sheet 25 and the radial inner end portion of the wiring substrate 24. That is to say, in the present preferred embodiment, the first insulating sheet 25 is not arranged on the lower surface of the annular wall portion 213 as a slant surface or a stepped surface. This makes it possible to prevent the first insulating sheet 25 from being separated downward from the base member 21.

In the present preferred embodiment, as shown in FIG. 3, the radial inner end portion of the first insulating sheet 25 is positioned radially outward of the radial inner end portion of the inner circumferential surface defining the base through-hole 51. Furthermore, the axial thickness of the base member 21 at the radial inner side of the base through-hole 51 is larger than the axial thickness of the base member 21 measured in the base groove portion 52. This increases the rigidity of the base member 21 at the radial inner side of the base through-hole 51.

As shown in FIG. 3, the stationary unit 2 preferably further includes an adhesive agent 29 provided as a sealing material. The adhesive agent 29 is not electrically conductive. The base through-hole 51 is sealed by the adhesive agent 29. This prevents gas from flowing through the base through-hole 51. As a result, it is possible to enhance the air-tightness of the disk drive apparatus 1. In addition, the lead wires 421 are fixed within the base through-hole 51 by the adhesive agent 29. As a result, the lead wires 421 are prevented from protruding axially below the lower surface of the bottom portion 212. Since the adhesive agent 29 covers the inner circumferential surface defining the base through-hole 51, the lead wires 421 are prevented from contacting the inner circumferential surface of the base through-hole 51 and eventually becoming short-circuited.

In the present preferred embodiment, the adhesive agent 29 is preferably arranged, not only within the base through-hole 51, but also within the base groove portion 52. This makes it possible to fix the lead wires 421 by the adhesive agent 29 over a broader range. It is therefore possible to prevent the lead wires 421 from protruding axially below the lower surface of the bottom portion 212.

In the present preferred embodiment, the axial depth of the base groove portion 52 is preferably larger than the sum of the thickness of the first insulating sheet 25, the diameter of each of the lead wires 421, and the application thickness of the adhesive agent 29. Thus, it is possible to prevent the adhesive agent 29 from being protruded axially downward from the base groove portion 52.

Other sealing materials may be used in place of the adhesive agent 29 if so desired. For example, a resin material other than the adhesive agent 29 may be used as a sealing material.

While one illustrative preferred embodiment of the present invention has been described above, the present invention is not limited to the aforementioned preferred embodiment.

Figure 4:
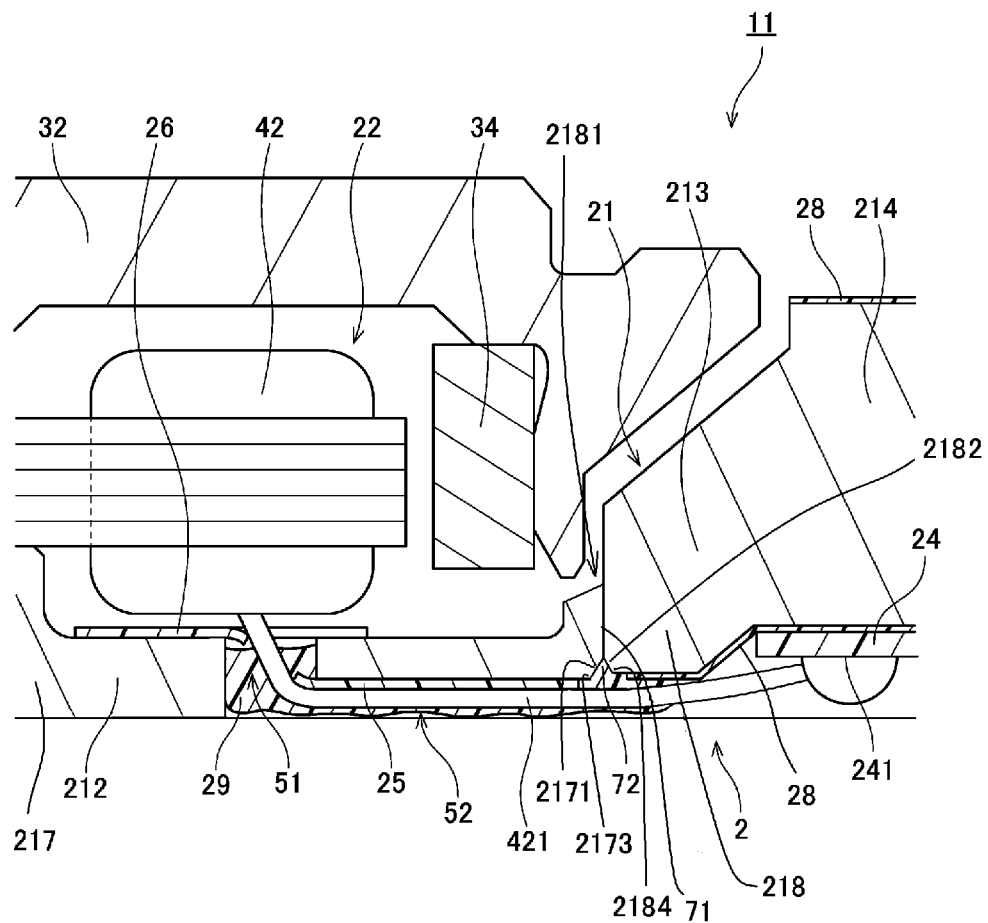
FIG. 4 is a partial vertical sectional view of a motor according to one modified example of a preferred embodiment of the present invention.

FIG. 4 is a partial vertical sectional view of a motor according to one modified example of a preferred embodiment of the present invention. In the example shown in FIG. 4, each of the inner edge 2183 and the outer edge 2172 preferably includes a slant surface. The slant surface includes an exposed region. At least one of the inner edge 2183 and the outer edge 2172 may include a slant surface. Alternatively, both the inner edge 2183 and the outer edge 2172 may include a slant surface.

A base body slant surface 2182 as one example of the aforementioned slant surface is defined in the inner edge 2183 of the base body portion 218 opposed to the outer edge 2172. In other words, the inner edge 2183 preferably includes a base body slant surface 2182. As shown in FIG. 4, the radial distance between the center axis 9 and the base body slant surface 2182 gradually decreases axially upward. The base body slant surface 2182 extends in the circumferential direction on the peripheral edge portion. In this example, the base body slant surface 2182 is arranged on the peripheral edge portion to extend over the entire circumference.

A motor base slant surface 2171 as one example of the aforementioned slant surface is defined in the outer edge 2172 of the base groove portion 52. In other words, the outer edge 2172 of the base groove portion 52 preferably includes a motor base slant surface 2171. The motor base slant surface 2171 is radially opposed to the base body slant surface 2182.

The radial distance between the center axis 9 and the motor base slant surface 2171 gradually increases axially upward. The motor base slant surface 2171 extends in the circumferential direction on the outer edge 2172 of the base groove portion 52. In the example shown in FIG. 4, the motor base slant surface 2171 is arranged to extend over the entire circumference of the outer edge 2172 of the base groove portion 52.

In the base groove portion 52, a border groove portion 72 extending in the circumferential direction is preferably positioned in the border between the inner edge 2183 and the outer edge 2172. The inner edge 2183 is preferably covered with an adhesive agent 29. The outer edge 2172 is also covered with the adhesive agent 29. That is to say, the border groove portion 72 is covered with the adhesive agent 29. For that reason, the lead wires 421 arranged within the base groove portion 52 do not contact the border groove portion 72 but contacts the adhesive agent 29. That is to say, the adhesive agent 29 serves as an insulating layer. Thus, the lead wires 421 are prevented from contacting the border groove portion 72 and are electrically insulated from the motor base portion 217 and the base body portion 218.

Each of the slant surfaces preferably includes a corner portion at the lower end thereof. More specifically, the base body slant surface 2182 preferably includes an outer corner portion 2184 at the lower end thereof. Likewise, the motor base slant surface 2171 preferably includes an inner corner portion 2173 at the lower end thereof. Each of the corner portions includes an exposed region not covered with the insulating film 28. Since each of the corner portions is covered with the adhesive agent 29, the lead wires 421 are prevented from contacting the corner portions and are electrically insulated from the motor base portion 217 and the base body portion 218.

Each of the slant surfaces may be a curved surface. At least one of the inner edge 2183 and the outer edge 2172 may include a curved surface. Alternatively, both the inner edge 2183 and the outer edge 2172 may include a curved surface. Even if each of the slant surfaces is a curved surface, each of the slant surfaces preferably includes a corner portion at the lower end thereof. More specifically, the base body slant surface 2182 preferably includes an outer corner portion 2184 at the lower end thereof. Likewise, the motor base slant surface 2171 preferably includes an inner corner portion 2173 at the lower end thereof. Each of the corner portions includes an exposed region not covered with the insulating film 28. Since each of the corner portions is covered with the adhesive agent 29, the lead wires 421 are prevented from contacting the corner portions and are electrically insulated from the motor base portion 217 and the base body portion 218.

The base body slant surface 2182 need not necessarily be arranged over the entire circumference of the inner edge 2183 of the base body portion 218. The base body slant surface 2182 may be arranged on a portion of the inner edge 2183 of the base body portion 218. A plurality of base body slant surfaces 2182 may be arranged on the inner edge of the base body portion 218 along the circumferential direction.

The motor base slant surface 2171 need not be arranged over the entire circumference of the outer edge 2172 of the motor base portion 217 defining the base groove portion 52. The motor base slant surface 2171 may be arranged on a portion of the end portion. The motor base slant surface 2171 may be arranged on a region defining a portion of the bottom portion of the base groove portion 52 or may be arranged on the end portion other than the base groove portion 52. A plurality of motor base slant surfaces 2171 may be arranged on the end portion along the circumferential direction.

In case where a plurality of motor base slant surfaces 2171 and a plurality of base body slant surfaces 2182 are provided, the circumferential positions thereof need not be necessarily aligned with each other. For example, the border groove portion 72 may be defined by a region where the motor base slant surface 2171 is not arranged and a region where the base body slant surface 2182 is arranged. Similarly, the border groove portion 72 may be defined by a region where the motor base slant surface 2171 is arranged and a region where the base body slant surface 2182 is not arranged.

The motor base slant surface 2171 and the base body slant surface 2182 need not be necessarily slant surfaces. One of the motor base slant surface 2171 and the base body slant surface 2182 may be a curved surface and the other may be a slant surface.

The radial outer end portion of the first insulating sheet 25 may be arranged radially outward of the end portion of the motor base portion 217 defining the base groove portion 52.

Figure 5:
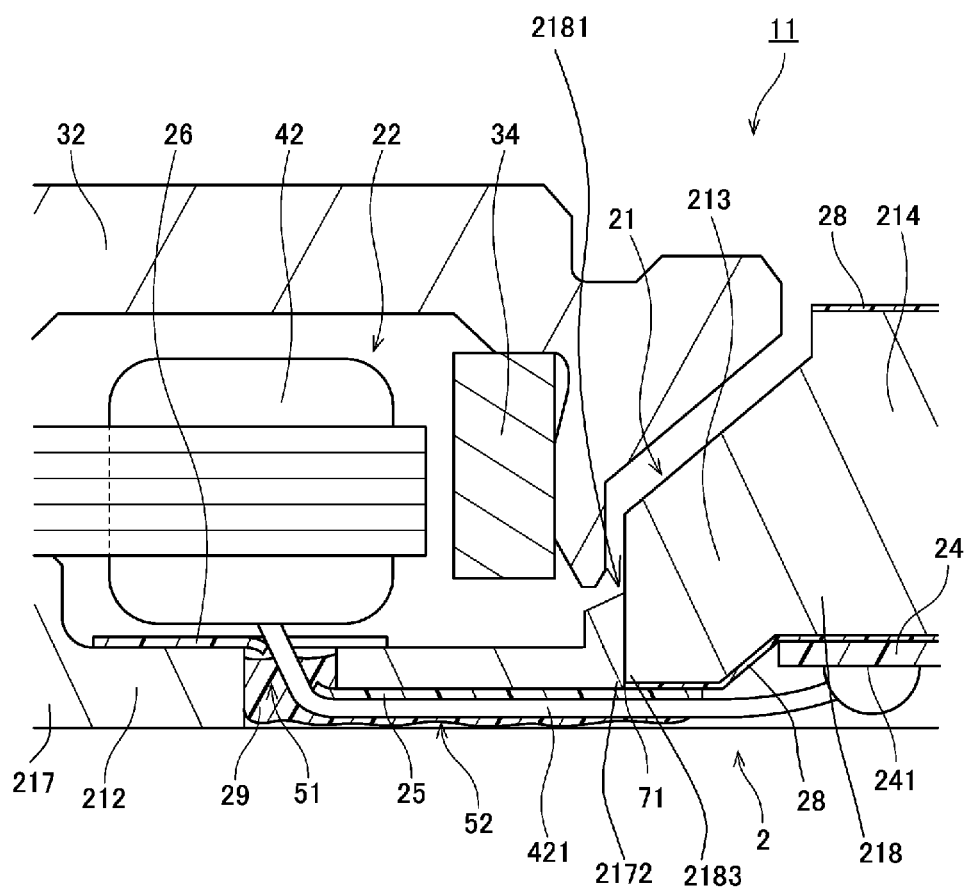
FIG. 5 is a partial vertical sectional view of a motor according to another modified example of a preferred embodiment of the present invention.

FIG. 5 is a partial vertical sectional view of a motor according to another modified example of a preferred embodiment of the present invention. As shown in FIG. 5, the radial outer end portion of the first insulating sheet 25 extends radially outward of the end portion of the motor base portion 217 defining the base groove portion 52. At least a portion of the radial outer end portion of the first insulating sheet 25 axially overlaps with the insulating film 28 of the base body portion 218. The first insulating sheet 25 preferably covers the border 71 between the end portion of the motor base portion 217 defining the base groove portion 52 and the peripheral edge portion of the base body portion 218. In other words, if the first insulating sheet 25 is arranged in the aforementioned manner, the first insulating sheet 25 is preferably positioned between the lead wires 421 and the motor base portion 217 and between the lead wires 421 and the base body portion 218 within the base groove portion 52. As mentioned above, within the base groove portion 52, at least a portion of the inner edge 2183 of the base body portion 218 is not covered with the insulating film 28. Moreover, the motor base portion 217 is preferably not subjected to an insulating process. For that reason, if the first insulating sheet 25 is arranged in the aforementioned manner, the lead wires 421 are electrically insulated from the motor base portion 217 and the base body portion 218.

Figure 6:
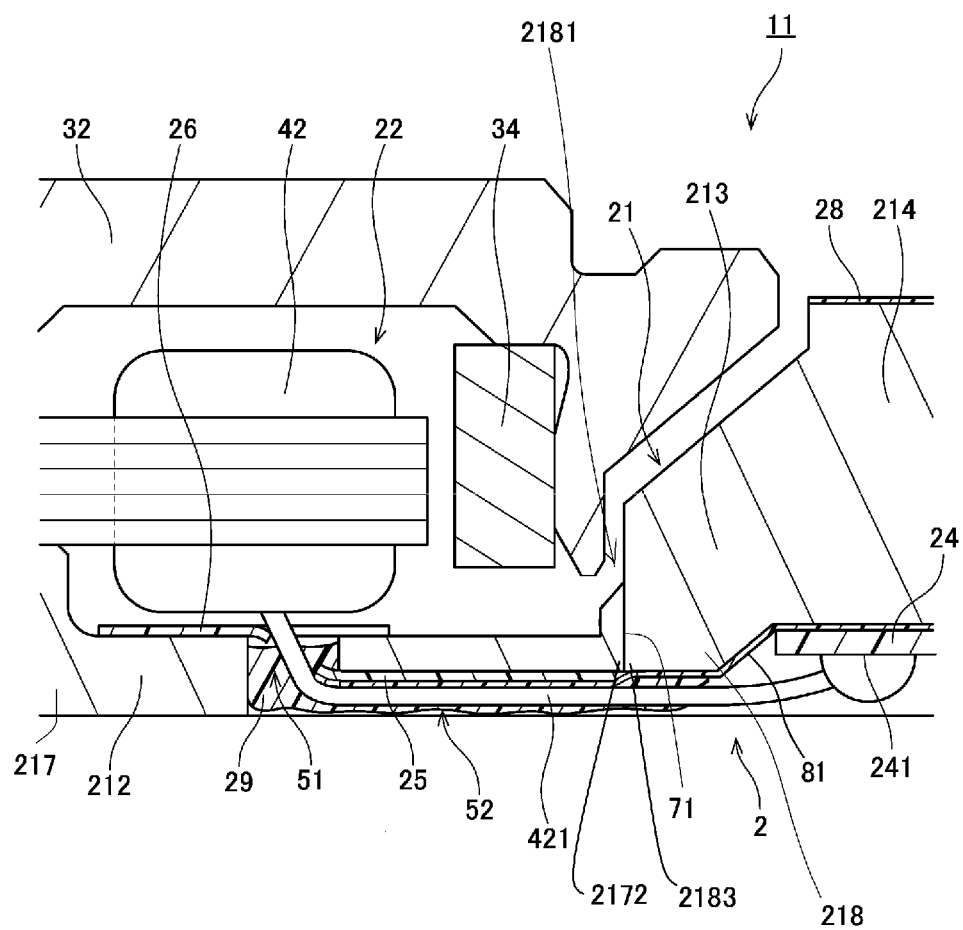
FIG. 6 is a partial vertical sectional view of a motor according to a further modified example of a preferred embodiment of the present invention.

The lower surface of the base body portion 218 may not be coated with the insulating film 28, but may be subjected to other insulating processes if so desired. FIG. 6 is a partial vertical sectional view of a motor according to a further modified example of a preferred embodiment of the present invention. As shown in FIG. 6, a third insulating sheet 81 is preferably arranged on the lower surface of the base body portion 218. The third insulating sheet 81 is positioned between the wiring substrate 24 and the lower surface of the base body portion 218. The third insulating sheet 81 extends radially inward. The third insulating sheet 81 is preferably arranged to extend from a region where the wiring substrate 24 is arranged to an opening of the base through-hole 51 of the base groove portion 52. In a region of the lower surface of the motor base portion 217 defining the base groove portion 52, the third insulating sheet 81 axially overlaps with the first insulating sheet 25. More specifically, the first insulating sheet 25 is preferably arranged axially below the lower surface of the motor base portion 217 defining the base groove portion 52 and the third insulating sheet 81 is preferably arranged axially below the first insulating sheet 25. It is preferred that the third insulating sheet 81 be arranged along the lower surface of the first insulating sheet 25. The third insulating sheet 81 is preferably positioned between the lead wires 421 and the bottom surface of the base groove portion 52. The third insulating sheet 81 preferably covers the border 71 between the motor base portion 217 and the through-hole 2181 of the base body portion 218, the outer edge 2172 of the base groove portion 52 and the inner edge 2183 of the base body portion 218 opposed to the outer edge 2172. That is to say, the third insulating sheet 81 serves as an insulating layer.

A portion of the sealing material described above may be arranged between the first insulating sheet 25 and the third insulating sheet 81 if so desired. This arrangement prevents the third insulating sheet 81 from being separated from the first insulating sheet 25. In the radial direction, a space may be provided between the first insulating sheet 25 and the third insulating sheet 81. It is preferred that the lead wires 421 be arranged on the lower surface of the third insulating sheet 81. A sealing material, such as, for example, the adhesive agent 29 described above, may be arranged between the lead wires 421 and the third insulating sheet 81. Consequently, the lead wires 421 are prevented from being separated from the third insulating sheet 81. This makes it possible to prevent the lead wires 421 from protruding axially downward from the base groove portion 52.

Instead of the insulating film 28, a portion of the wiring substrate 24 may alternatively be arranged on the lower surface of the base body portion 218. In this case, a portion of the wiring substrate 24 serves as an electrically insulating layer. The wiring substrate 24 preferably includes a plurality of layers. The wiring substrate 24 preferably includes a cover layer 242 arranged to insulate the land portions 241 from other portions. For instance, a polyimide film, a photo solder resist film, etc., is preferably used as the cover layer 242.

Figure 7:
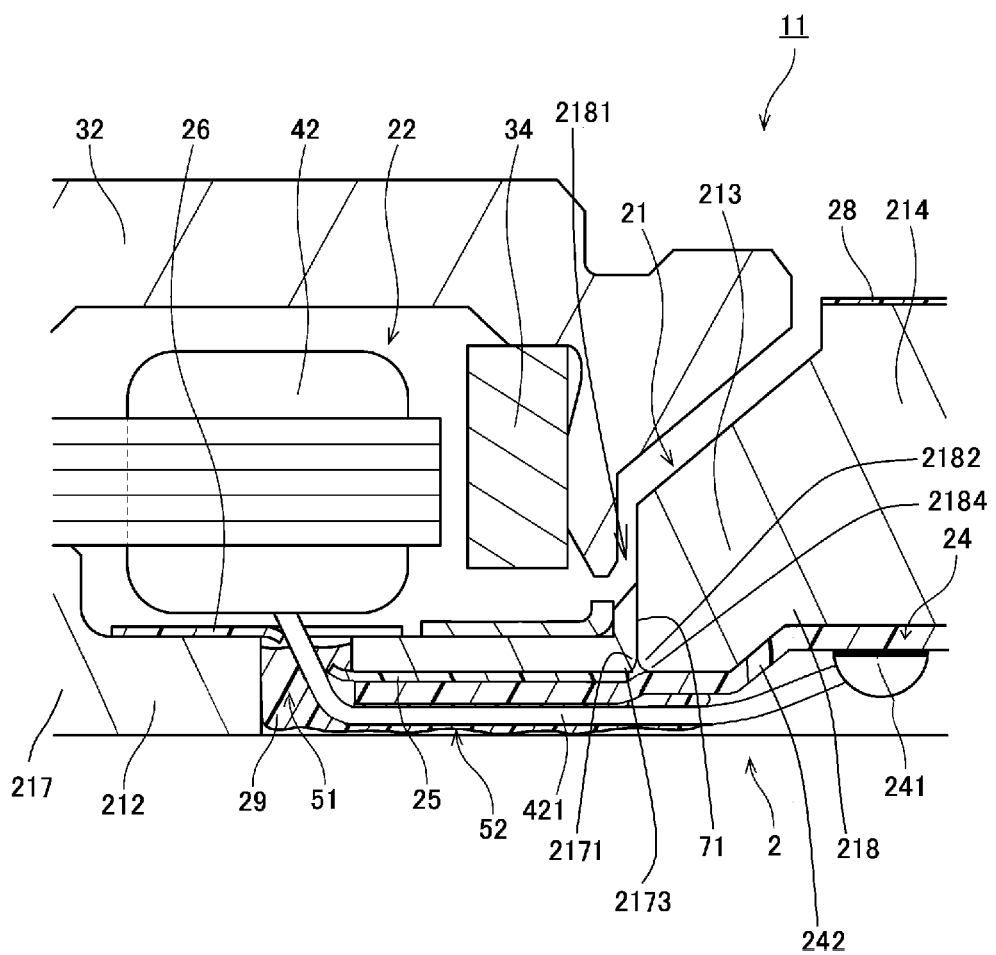
FIG. 7 is a partial vertical sectional view of a motor according to a still further modified example of a preferred embodiment of the present invention.

FIG. 7 is a partial vertical sectional view of a motor according to a still further modified example of a preferred embodiment of the present invention. As shown in FIG. 7, the cover layer 242 of the wiring substrate 24 extends radially inward to the base through-hole 51. In other words, the cover layer 242 of the wiring substrate 24 serving as an electrically insulating layer preferably covers the lower surface of the motor base portion 217 defining the base groove portion 52, the border 71 between the motor base portion 217 and the base body portion 218, the outer edge 2172 of the motor base portion 217, and the inner edge 2183 of the base body portion 218. At least a portion of the cover layer 242 axially overlaps with the first insulating sheet 25. More specifically, the first insulating sheet 25 is preferably arranged axially below the motor base portion 217 and the cover layer 242 is preferably arranged axially below the first insulating sheet 25. It is preferred that the cover layer 242 be arranged along the lower surface of the first insulating sheet 25. Within the base groove portion 52, the lead wires 421 are arranged axially below the cover layer 242. The aforementioned sealing material may be arranged between the lead wires 421 and the cover layer 242. Consequently, the lead wires 421 are prevented from being separated from the cover layer 242. This makes it possible to prevent the lead wires 421 from protruding out of the base groove portion 52.

Figure 8:
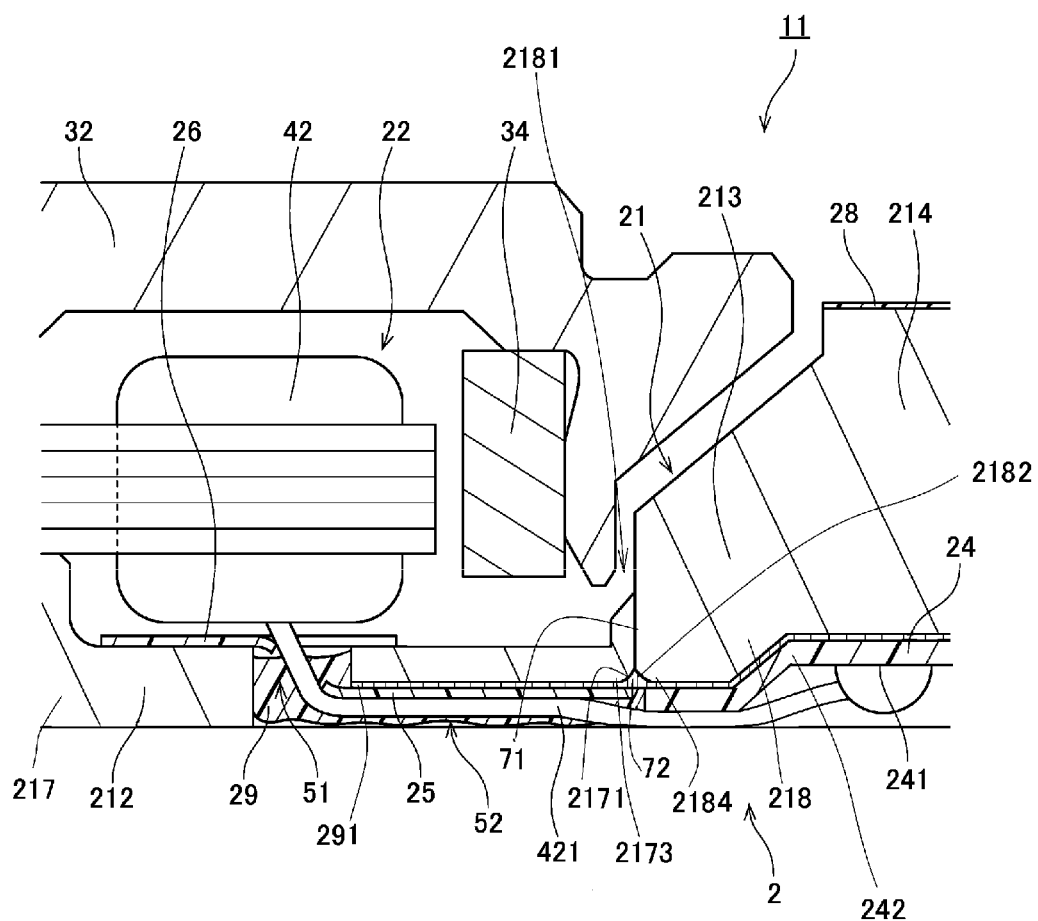
FIG. 8 is a partial vertical sectional view of a motor according to a yet still further modified example of a preferred embodiment of the present invention.

An adhesive agent 29 may be arranged on the bottom of the base groove portion 52 or on the lower surface of the base body portion 218. FIG. 8 is a partial vertical sectional view of a motor according to a yet still further modified example of a preferred embodiment of the present invention. As shown in FIG. 8, an adhesive agent 291 as an electrically insulating layer is applied on the lower surface of the motor base portion 217 defining the base groove portion 52. A non-conductive adhesive agent is preferably used as the adhesive agent 291.

The first insulating sheet 25 is arranged on the adhesive agent 291 applied on the lower surface of the motor base portion 217.

The adhesive agent 291 is also preferably arranged on at least a portion of the lower surface of the base body portion 218. The wiring substrate 24 is preferably arranged on the lower surface of the base body portion 218 on which the adhesive agent 291 is applied.

The adhesive agent 291 is also preferably arranged in the border 71 between the motor base portion 217 and the base body portion 218 on the lower surface of the base member 21. The border groove portion 72 described above is positioned in the border 71 between the motor base portion 217 and the base body portion 218 on the lower surface of the base member 21. The border groove portion 72 is positioned at least in the border 71 between the base body portion 218 and the base groove portion 52. The adhesive agent 291 covers the border groove portion 72. In other words, on the lower surface of the base member 21, the adhesive agent 291 covers the area extending from the base groove portion 52 to the region of the lower surface of the base body portion 218 where the wiring substrate 24 is arranged.

The adhesive agent 291 is positioned between the first insulating sheet 25 and the lower surface of the motor base portion 217 defining the base groove portion 52. The radial outer end portion of the first insulating sheet 25 extends to the border 71 between the base body portion 218 and the motor base portion 217 on the lower surface of the base member 21. The wiring substrate 24 preferably includes the cover layer 242 mentioned above. The cover layer 242 extends to the border 71 between the base body portion 218 and the motor base portion 217 on the lower surface of the base member 21. The radial outer end portion of the first insulating sheet 25 is radially opposed to the radial inner end portion of the wiring substrate 24 (namely, the cover layer 242) with a gap left therebetween. The adhesive agent 291 may be arranged between the radial outer end portion of the first insulating sheet 25 and the radial inner end portion of the wiring substrate 24 (namely, the cover layer 242). The lead wires 421 are arranged on the first insulating sheet 25 and the cover layer 242 and are connected to the land portions 241.

The border groove portion 72 may not be arranged in the border 71 between the lower surface of the motor base portion 217 defining the base groove portion 52 and the base body portion 218. In other words, the motor base slant surface 2171 need not be necessarily arranged in the motor base portion 217. The base body slant surface 2182 need not be necessarily arranged in the base body portion 218.

The adhesive agent 291 need not be necessarily applied on the lower surface of the motor base portion 217 defining the base groove portion 52 or on the base body portion 218. The adhesive agent 29 may instead be arranged only in the border groove portion 72 or only in the border 71 between the lower surface of the motor base portion 217 and the base body portion 218.

Figure 9:
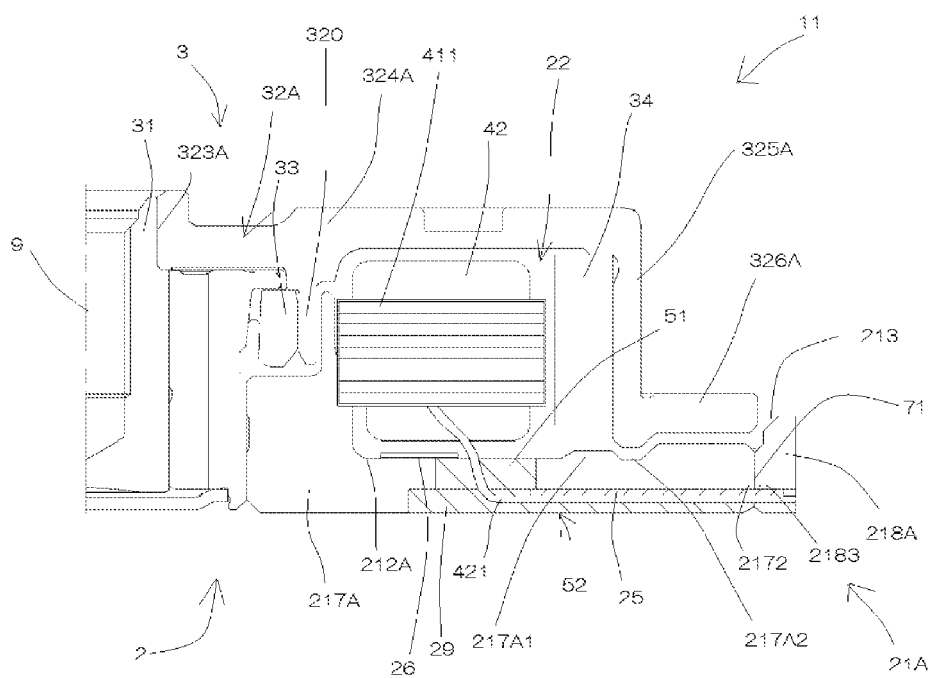
FIG. 9 is a partial vertical sectional view of a motor according to an even further modified example of a preferred embodiment of the present invention.

As shown in FIG. 9 which shows a motor according to an even further modified example of a preferred embodiment of the present invention, the stationary unit 2 preferably includes an adhesive agent 29 as a sealing material. The adhesive agent 29 is not electrically conductive. The base through-hole 51 is sealed by the adhesive agent 29. More specifically, a portion of the adhesive agent 29 is filled into the base through-hole 51. This prevents gas from flowing through the base through-hole 51. As a result, it becomes possible to increase the air-tightness within the disk drive apparatus 1. The lead wires 421 are fixed within the base through-hole 51 by the adhesive agent 29. Consequently, it is possible to prevent the lead wires 421 from protruding axially below the lower surface of the bottom portion 212. Since the adhesive agent 29 covers the inner circumferential surface defining the base through-hole 51, the lead wires 421 are prevented from contacting the inner circumferential surface of the base through-hole 51 and eventually getting short-circuited.

In the present preferred embodiment, the adhesive agent 29 is not only arranged within the base through-hole 51 but is also preferably within the base groove portion 52. More specifically, the adhesive agent 29 covers at least a portion of each of the lead wires 421 within the base groove portion 52. Within the base groove portion 52, the lower surface of the adhesive agent 29 is positioned below the lead wires 421 and above the lower surface of the motor base portion 217. This makes it possible to fix the lead wires 421 with the adhesive agent 29 over a broader range. It is therefore possible to prevent the lead wires 421 from protruding axially below the lower surface of the bottom portion 212. The adhesive agent 29 and the adhesive agent 291 may contact each other. The adhesive agent 29 may be made of the same material as the adhesive agent 291. The adhesive agent 29 and the adhesive agent 291 may be made of a non-conductive resin material.

The shape of the base member 21 and the hub 32 is not limited to the aforementioned one. FIG. 9 is a partial vertical sectional view. As shown in FIG. 9, the hub 32A preferably includes a top plate portion 324A, a hub cylinder portion 325A, and a disk placing portion 326A. The top plate portion 324A is preferably a disc-shaped or substantially disc-shaped member. The top plate portion 324A preferably includes a hub through-hole 323A to which the upper end portion of the shaft 31 is fixed. The hub cylinder portion 325A is a tubular or a substantially tubular member. The hub cylinder portion 325A is preferably arranged radially outward of the top plate portion 324A to extend axially downward. The magnet 34 described above is arranged on the inner circumferential surface of the hub cylinder portion 325A.

The disk placing portion 326A preferably has an annular or a substantially annular shape and extends radially outward from the axial lower end portion of the hub cylinder portion 325A. When the disk (not shown) is arranged on the hub 32A, the hub cylinder portion 325A is fixed to a disk through-hole. The lower surface of the disk is axially contiguous to the disk placing portion 326A.

The base member 21A preferably includes a motor base portion 217A and a base body portion 218A. Unlike the motor base portion 217 described above, the second cylinder portion 216 is not arranged in the base member 21A shown in FIG. 9. A thrust protrusion portion 217A1 protruding axially upward is preferably provided on the upper surface of the motor base portion 217A. The thrust protrusion portion 217A1 preferably has an annular or a substantially annular shape. The thrust protrusion portion 217A1 is axially opposed to the magnet 34. Just like the motor base portion 217 described above, a magnetic material is preferably used as the material of the motor base portion 217A. For that reason, a magnetic attraction force acts between the thrust protrusion portion 217A1 and the magnet 34. The axial distance between the thrust protrusion portion 217A1 and the magnet 34 is shorter than the axial distance between the bottom portion 212A and the magnet 34. For that reason, the magnetic attraction force acting between the thrust protrusion portion 217A1 and the magnet 34 is larger than the magnetic attraction force acting between the bottom portion 212A and the magnet 34. Therefore, even if a shocking force is applied from the outside to the motor 11, it is possible to prevent the rotary unit 3 from being axially separated from the stationary unit 2.

A thrust recess portion 217A2 is arranged radially outward of the thrust protrusion portion 217A1. The thrust recess portion 217A2 extends in the circumferential direction. The thrust recess portion 217A2 preferably has an annular or a substantially annular shape. The thrust recess portion 217A2 is axially opposed to the axial lower end portion of the hub cylinder portion 325A. At least a portion of the axial lower end portion of the hub cylinder portion 325A is preferably arranged within the thrust recess portion 217A2. The axial lower end portion of the magnet 34 is arranged axially above the axial lower end portion of the hub cylinder portion 325A. For that reason, despite the arrangement of the thrust protrusion portion 217A1, it is possible to have the thrust protrusion portion 217A1 come close to the hub cylinder portion 325A in the axial direction. Therefore, it is possible to prevent the axial dimension of the motor 11 from growing larger due to the arrangement of the thrust protrusion portion 217A1.

Even if the hub or the base member has different structures, it is still possible to apply the insulating structure in which an insulating layer is provided by the respective insulating sheets 25 and 26, the wiring substrate 24, the adhesive agent 29, or the like. As an additional insulating structure, the insulating sheets may axially overlap with the wiring substrate (not shown).

Figure 10:
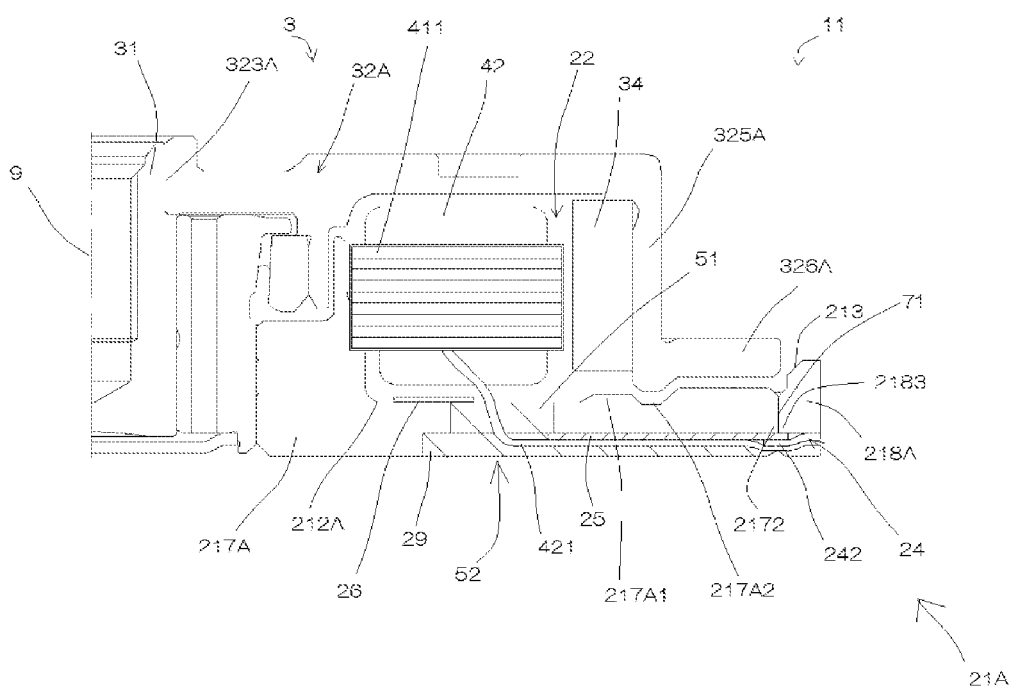
FIG. 10 is a partial vertical sectional view of a motor according to an additionally further modified example of a preferred embodiment of the present invention.

FIG. 10 is a partial vertical sectional view of a motor according to an additional modified example of a preferred embodiment of the present invention. As shown in FIG. 10, the first insulating sheet 25 is preferably arranged on the lower surface of the motor base portion 217A defining the base groove portion 52. On the lower surface of the base member 21A, the first insulating sheet 25 covers the border 71 between the motor base portion 217A and the base body portion 218A.

The wiring substrate 24 preferably includes the cover layer 242 described above. The cover layer 242 extends from the base body portion 218A toward the base through-hole 51. The cover layer 242 preferably covers the border 71 between the motor base portion 217A and the base body portion 218A. The cover layer 242 axially overlaps with the first insulating sheet 25. More specifically, on the lower surface of the base member 21A, at least a portion of the first insulating sheet 25 is preferably arranged on the border 71 between the motor base portion 217A and the base body portion 218A. The cover layer 242 is arranged axially below the first insulating sheet 25 arranged in the border 71 between the motor base portion 217A and the base body portion 218A. The lead wires 421 are arranged axially below the region where the first insulating sheet 25 and the cover layer 242 axially overlap with each other. The sealing material described above may be arranged in at least one of the gap between the lead wires 421 and the cover layer 242, the gap between the cover layer 242 and the first insulating sheet 25, and the gap between the first insulating sheet 25 and the border 71. This arrangement makes it possible to prevent the respective members from being axially separated from one another and to prevent the respective members from protruding out of the base groove portion 52.

The number of the base groove portion 52 is not limited to one. A plurality of base groove portions 52 may be arranged on the lower surface of the motor base portion 217. In this case, it is preferred that the respective base groove portions 52 be arranged along the circumferential direction. Each of the lead wires 421 may be arranged in each of the base groove portions 52. A plurality of lead wires 421 may be arranged in one base groove portion 52. A base groove portion 52 in which the lead wires 421 are arranged and a base groove portion 52 in which the lead wires 421 are not arranged may be provided.

In a case where a plurality of base groove portions 52 is arranged in the motor base portion 217, a plurality of first insulating sheets 25 may preferably be arranged in a corresponding relationship with the respective base groove portions 52. A single first insulating sheet 25 may have a plurality of insulating portions corresponding to the respective base groove portions 52.

The through-hole 2181 need not be a through-hole capable of accommodating the motor base portion 217. Instead, the through-hole 2181 may be a depressed portion capable of accommodating the bottom portion of the motor base portion 217. In this case, the base through-hole 51 extends through the lower surface of the motor base portion 217 and the bottom of the through-hole 2181. The lead wires 421 are led out through the base through-hole 51.

In the present preferred embodiment, the inner circumferential surface of the base body portion 218 and the outer circumferential surface of the second cylinder portion 216 are preferably parallel or substantially parallel to the center axis 9. However, the inner circumferential surface of the base body portion 218 and the outer circumferential surface of the second cylinder portion 216 may have different shapes. For instance, the inner circumferential surface of the base body portion 218 and the outer circumferential surface of the second cylinder portion 216 may be inclined with respect to the center axis 9.

The peripheral edge portion of the through-hole 2181 and the outer edge portion of the second cylinder portion 216 may include a stepped surface. In case of the base member 21A not provided with the second cylinder portion 216, the outer edge portion of the motor base portion 217A may include a stepped surface.

The through-hole 2181 may not extend completely through the base body portion 218 in the up-and-down direction such that the through-hole 2181 may alternatively be the depressed portion.

The wiring substrate 24 may extend to the lower surface of the annular wall portion 213. A recess portion may be provided in the region of the wiring substrate 24 positioned on the lower surface of the annular wall portion 213. The land portions 241 may be arranged in the recess portion. The lead wires 421 may be soldered to the land portions 241.

The shape of the motor base portion 217 is not limited to the one of the aforementioned preferred embodiment. For example, the motor base portion 217 may be provided with the annular wall portion 213.

Moreover, the wiring substrate 24 may not be necessarily a flexible printed circuit substrate. Instead, the wiring substrate 24 may be, e.g., a rigid substrate such as a connector or the like.

The motor of the preferred embodiments of the present invention and the modifications thereof can be applied to different kinds of disk drive apparatuses. The disk drive apparatus may be the one that rotates a disk other than the magnetic disk, e.g., an optical disk. When rotating the optical disk, it is preferred that a rubber member be arranged in the portion of the hub axially opposed to the optical disk. According to the preferred embodiments of the present invention and the modifications thereof, it is possible to make the disk drive apparatus thinner, especially thinner in the axial direction. Accordingly, the preferred embodiments of the present invention and the modifications thereof are applicable to a motor used in, e.g., a disk drive apparatus for a thin notebook-type PC or a thin tablet-type PC.

In the aforementioned preferred embodiments of the present invention and the modifications thereof, description has been made on a so-called shaft rotating type motor in which a sleeve belongs to a stationary unit with a shaft belonging to a rotary unit. However, the motor of the present invention may alternatively be a so-called shaft fixing type motor in which a shaft belongs to a stationary unit with a sleeve belonging to a rotary unit.

The preferred embodiments of the present invention and the modifications thereof can find application in, e.g., a motor and a disk drive apparatus.

Features of the above-described preferred embodiments and the modifications thereof may be combined appropriately as long as no conflict arises.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A motor for use in a disk drive apparatus for rotating a disk about a center axis extending in an up and down direction, the motor comprising:
    a base member extending radially outward from the center axis; and
    a stator supported on the base member and provided with a plurality of coils; wherein
    the base member includes a radially-extending flat base body portion including a through-hole or a depressed portion and a motor base portion arranged in the through-hole or the depressed portion of the base body portion, the motor base portion including a disc-shaped or substantially disc-shaped bottom portion extending radially outward;
    the motor base portion is made of a first kind of metal, the base body portion made of a second kind of metal, the first kind of metal being larger in Young's modulus than the second kind of metal;
    the motor base portion includes a base through-hole arranged to bring an upper surface and a lower surface of the motor base portion into communication with each other and a base groove portion positioned on the lower surface of the motor base portion and depressed toward the upper surface of the motor base portion, the base groove portion extending radially outward from the base through-hole and reaching a radial outer edge of the lower surface of the motor base portion;
    at least one lead wire is led out from the coils, the at least one lead wire extending from the upper surface of the motor base portion to the lower surface of the motor base portion via the base through-hole and then extending radially outward through the base groove portion;
    at least a portion of a lower surface of the base body portion is covered with an insulating film;
    an outer circumferential surface of the motor base portion and an inner circumferential surface of the base body portion, which are opposed to each other, include an exposed region which is not covered with the insulating film; and
    an insulating layer is arranged between the at least one lead wire and a bottom surface of the base groove portion to cover a border between the motor base portion and the base body portion, an outer edge of the base groove portion and an inner edge of the base body portion opposed to the outer edge of the base groove portion.

2. The motor of claim 1, wherein at least one border groove portion extending in a circumferential direction is positioned in a border between the inner edge of the base body portion and the outer edge within the base groove portion.

3. The motor of claim 2, wherein at least one of the inner edge and the outer edge includes a slant surface or a curved surface inclined with respect to the center axis, the slant surface or the curved surface includes the exposed region, the slant surface or the curved surface includes a lower end where a corner portion exists, and the insulating layer is arranged to cover the corner portion.

4. The motor of claim 2, wherein the insulating layer is a non-conductive adhesive agent and the border groove portion is covered by the adhesive agent.

5. The motor of claim 1, wherein at least a portion of a radial inner end portion of the insulating layer axially overlaps with the base through-hole.

6. The motor of claim 1, wherein a sealing material is arranged within the base through-hole.

7. The motor of claim 6, wherein the insulating layer contacts the sealing material.

8. The motor of claim 7, wherein the sealing material is arranged to cover at least a portion of the lead wire within the base groove portion, and the sealing material includes a lower surface positioned below the lead wire and above the lower surface of the motor base portion.

9. The motor of claim 2, wherein the border groove portion includes an exposed region.

10. The motor of claim 1, wherein a wiring substrate electrically connected to the at least one lead wire is arranged on a lower surface of the base member, and the insulating layer defines at least a portion of the wiring substrate.

11. The motor of claim 1, wherein a wiring substrate electrically connected to the lead wire is arranged on a lower surface of the base member, the wiring substrate includes at least one land portion electrically connected to the at least one lead wire, and the land portion is arranged on a lower surface of the base body portion.

12. A disk drive apparatus, comprising:
    the motor of claim 1;
    at least one disk arranged to be rotated by the motor;
    a head arranged to perform at least one of reading and writing tasks with respect to the disk;
    an access unit arranged to displace the head; and
    a housing arranged to accommodate the motor, the disk, the head, and the access unit.

* * * * *